(12) United States Patent
Iizuka

(10) Patent No.: US 6,787,190 B2
(45) Date of Patent: Sep. 7, 2004

(54) WATER BASED PAINT COMPOSITIONS

(75) Inventor: Takanobu Iizuka, Kanuma (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 153 days.

(21) Appl. No.: 10/152,633

(22) Filed: May 23, 2002

(65) Prior Publication Data

US 2002/0177653 A1 Nov. 28, 2002

(30) Foreign Application Priority Data

May 24, 2001 (JP) .......................................... 2001-154708

(51) Int. Cl.⁷ .......................... B05D 3/02; B32B 27/00; B32B 27/40; C08K 3/20; C08L 75/00
(52) U.S. Cl. .................. 427/385.5; 427/372.2; 428/423.1; 524/591; 524/839; 524/840
(58) Field of Search ................. 524/591, 839, 524/840; 427/385.5, 372.2; 428/423.1

(56) References Cited

U.S. PATENT DOCUMENTS 5,500,475 A 3/1996 Eicken et al.
4,755,435 A 7/1998 Fujii et al.

FOREIGN PATENT DOCUMENTS

GB 2 167 974 6/1986
GB 2 287 469 9/1995

*Primary Examiner*—Patrick D. Niland
(74) *Attorney, Agent, or Firm*—Wenderoth, Lind & Ponack, LLP

(57) ABSTRACT

This invention provides a water based paint composition containing polyurethane resin which is formed by urethanation reaction of polyisocyanate compound with polyalkylene glycol and a further reaction of so formed isocyanate-containing prepolymer with a monohydric alcohol having at least 5 carbons, and water-soluble organic solvent having boiling point not higher than 150° C.; and provides also a process for forming multi-layered coating, which comprises applying onto a metallic object cationic electropaint, above-described water based paint composition, water based intermediate coating and top coating, by the order stated.

15 Claims, No Drawings

WATER BASED PAINT COMPOSITIONS

This invention relates to water based paint compositions which are useful for improving chipping resistance and corrosion resistance, etc, of multi-layered coating formed of layers of cationic electropaint, intermediate coating and top coating, which are formed on metallic objects, in particular, car bodies and the like; and also to a process for forming multi-layered coating using such a water based paint composition.

Improvement in resistance properties of multi-layered coating composed of cationic electropaint, intermediate coating and top coating, which is applied onto outer shell portions of metallic car bodies, in particular, prevention of peeling or chipping due to impact exerted by collision with pebbles or gravel upflung by wheels of running cars, and prevention of thereby caused deterioration in corrosion resistance of the coating and progress in corrosion of the metal (coated object or substrate), is being attached increasing importance. For example, in cold districts of Europe and the United States, gravel mixed with a large amount of rock salt is often spread on road to prevent surface freezing, and cars running on such road frequently are hit with rock salt grains or small pebbles upflung by their wheels. Impacts so exerted on coated surfaces of car bodies frequently induce a phenomenon of local peeling of the coating, which is called "chipping". When the metallic substrate surfaces at the hit spots are exposed as the coating thereon is peeled off, rusting starts from those spots and corrosion progresses easily. Other problems also occur such that chipping of top coating markedly impairs aesthetic appearance of cars. Stripping of coated films by chipping usually takes place more frequently at cars' base or bottom portions and lower part of shell bodies around wheels, but it can occur also at hood and roof portions and local corrosion appreciably progresses within about a half to one year.

For the purpose of preventing such progress in corrosion of metal substrate caused by chipping, for example, U.S. Pat. No. 4,755,435 proposed to apply a barrier coating composed chiefly of modified polyolefin resin between an electrodeposited coating and intermediate coating. The modified polyolefin resin, however, is given a relatively high molecular weight and a large amount of organic solvent is required to dilute it to a viscosity suitable for application. This leads to such defects as adverse effects on safety and health of operators at the application time, environmental pollution after the application and danger of fire, explosion and the like during the application and baking. Moreover, when this barrier coating is left uncured before application of intermediate coating and top coating thereon, finished appearance factors of the multi-layered coating such as flow— and—leveling property are liable to be impaired and, therefore, it is the current practice to heat and dry the barrier coating before applying an intermediate coating thereon.

We have engaged in concentrative studies with the view to solve those problems as described above, and now discovered: a water based paint composition containing a polyurethane resin obtained by reaction of an isoiyanate-containing prepolymer with monohydric alcohol having at least 5 carbons, said prepolymer having been formed by urethanation reaction of polyisocyanate compound with polyalkylene glycol; and a water-soluble organic solvent having boiling point not higher than 150° C., excels in chipping resistance; and furthermore, application of this water based paint composition between a cationic electropaint coating and an intermediate coating enables to form multi-layered coating exhibiting excellent chipping resistance. The present invention is whereupon completed.

Thus, according to the present invention, water based paint compositions ("present paint compositions") are provided, which are characterized by containing (a) polyurethane resin obtained by reacting isocyanate-containing prepolymer with monohydric alcohol having at least 5 carbon atoms, said isocyanate-containing prepolymer having been obtained by urethanation reaction of polyisocyanate compound with polyalkylene-glycol, and (b) water-soluble organic solvent having boiling point not higher than 150° C.

Hereinafter the present paint composition is explained in further details.

The present paint composition can be formulated by, for example, causing conventional water based paint to contain: (a) polyurethane resin which is obtained by reacting isocyanate-containing prepolymer with monohydric alcohol having at least 5 carbon atoms, said prepolymer having been formed by urethanation reaction of polyisocyanate compound with polyalkylene glycol; and (b) a water-soluble organic solvent boiling at no higher than 150° C.

As such water based paints in which the polyurethane resin (a) and the water-soluble organic solvent (b) are incorporated following the present invention, those paints known per se can be used. For example, water based paints which contain, as vehicle component, base resin such as water-dispersible or water-soluble acrylic resin, polyester resin, alkyd resin, urethane resin and the like which have crosslinkable functional groups, e.g., hydroxyl groups, and crosslinking agent such as hydrophilic or hydrophobic melamine resin; and as individual occasions demand, further contain such paint additives as coloring pigment, extender, antisettle agent, organic solvent and the like, can be used, which are formed by mixing and dispersing those components with, and in, water.

Polyurethane resin (a) is obtained by forming an isocyanate-containing prepolymer by urethanation reaction of polyisocyanate compound with polyalkylene glycol, and further reacting the prepolymer with monohydric alcohol having at least 5 carbons.

Polyisocyanate compounds are those containing at least two, preferably two, isocyanate groups per molecule. As such, aliphatic, alicyclic and aromatic diisocyanate compounds are conveniently used, in particular, aliphatic and alicyclic diisocyanates are preferred. Examples of aliphatic and alicyclic diisocyanates include $C_2$–$C_{12}$ aliphatic diisocyanates such as hexamethylene diisocyanate, 2,2,4-trimethylhexane diisocyanate and lysine diisocyanate; $C_4$–$C_{18}$ alicyclic diisocyanates such as 1,4-cyclohexane diisocyanate, 1-isocyanato-3-isocyanatomethyl-3,5,5-trimethylcyclohexane (isophorone diisocyanate), 4,4'-dicyclohexylmethane diisocyanate, methylcyclohexylene diisocyanate and isopropylidenedicyclohexyl-4,4'-diisocyanate; and modifications of those diisocyanates (e.g., carbodiimide-, urethodione- or urethoimine-containing modified products). They may be used either singly or as combination of more than one.

Polyalkylene glycols to be reacted with these polyisocyanate compounds include polyether glycols which are obtained by (block or random) polymerization or copolymerization of at least one compound selected from alkylene oxides (for example, $C_2$–$C_7$ alkylene oxides such as ethylene oxide, propylene oxide, butylene oxide and the like) and cyclic ethers (for example, tetrahydrofuran and the like). Specific examples include polyethylene glycol, polypropylene glycol, polyethylene-propylene (block or random) glycol, polytetramethylene ether glycol, polyhexamethylene ether glycol and polyoctamethylene ether glycol. It is generally preferred for these polyalkylene glycols to have number-average molecular weight ranging 500–5,000, in particular, 1,000–3,000.

In the occasion of preparing such polyurethane resin (a), it is permissible to use, concurrently with those polyisocyanate compound and polyalkylene glycol, low molecular weight glycol(s) having number-average molecular weight less than 500, such as ethylene glycol, propylene glycol, 1,4-butanediol, 1,6-hexanediol, 3-methyl-1,5-pentanediol, neopentyl glycol and bishydroxymethylcyclohexane. Use rate of such low molecular weight glycol is usually not more than 20% by weight, preferably 0.1–20% by weight, inter alia 0.5–10% by weight, based on the weight of the polyalkylene glycol used.

Urethanation reaction of polyisocyanate compound with polykylene glycol (and if necessary low molecular weight glycol) may be performed under conditions known per se. These components are preferably reacted at such ratios that the formed isocyanate-containing prepolymer will contain at least two, preferably two, isocyanate groups per molecule.

Examples of monohydric alcohols having at least 5, preferably 6–10, carbon atoms, to be reacted with so obtained isocyanate-containing prepolymer include aliphatic alcohols such as amyl alcohol, hexyl alcohol, ethylbutyl alcohol, heptanol, octyl alcohol, 2-ethylhexyl alcohol, nonyl alcohol, decanol and the like. By effecting urethanation reaction of such monohydric alcohol with substantially all of the isocyanate groups contained in the above isocyanate-containing prepolymer, intended polyurethane resin (a) is obtained.

Said polyurethane resin (a) has in its molecule hydrophilic segments derived from polyalkylene glycol and hydrophobic segments derived from monohydric alcohol having at least 5 carbons, and may have number-average molecular weight usually within a range of 700–10,000, in particular, 1,300–5,000. It is desirable that said polyurethane resin (a) does not substantially have functional groups such as hydroxyl, isocyanate and the like in its molecule. Such polyurethane resin (a) includes those known per se, for example, commercially available TAFIGEL™ PUR-60" (Munzing Chemie GmbH).

Said water-soluble organic solvent (b) is one which has such solubility that at least 50 parts by weight, preferably at least 70 parts by weight, thereof is soluble in 100 parts by weight of water at 20° C. Said water-soluble organic solvent (b) preferably has boiling point not higher than 150° C., in particular, within a range of 80–130° C. Specific examples of such water-soluble organic solvent (b) include: methyl lactate, dioxolan, dioxane, ethylene glycol monomethyl ether, ethylene glycol monoethyl ether, monopropylene glycol methyl ether, methyl alcohol, ethyl alcohol, n-propyl alcohol, isopropyl alcohol and tert-butyl alcohol. In particular, ethylene glycol monomethyl ether, ethylene glycol monoethyl ether and monopropylene glycol methyl ether are preferred.

In the present paint compositions, blend ratios of polyurethane resin (a) and water-soluble organic solvent (b) can be selected over a wide range depending on, for example, kinds of those components used. Usually suitable range for polyurethane resin (a) is 0.01–10 parts by weight, in particular, 1–5 parts by weight (as solid) and that for water-soluble organic solvent (b) is 3–40 parts by weight, in particular, 5–20 parts by weight, both per 100 parts by weight of total resin component excepting that of polyurethane resin (a), in each paint composition according to the present invention.

While present paint compositions are useful as any of under coating, intermediate coating and top coating, because coating films thereof excel in chipping resistance, they can improve chipping resistance of multi-layered coating. For example, in an occasion of forming multi-layered coating on a metal substrate by successively applying a cationic electropaint (A), intermediate coating (C) and top coating (D), a present paint composition is applied onto the cationic electropaint-coated surface prior to application of an intermediate coating (C) thereon, to cause the coating film of the present paint composition to be present between the cationic electropaint coating and the intermediate coating, whereby to improve chipping resistance of resulting multi-layered coating.

Thus, according to the present invention, also a process ("the present process") for forming multi-layered coating is provided, which process comprising applying onto a metallic object or substrate a cationic electropaint (A), a present paint composition (B), a water based intermediate coating (C) and top coating (D), by the order stated.

Said metallic object is a substrate on which a multi-layered coating is to be formed according to the present process, which is subject to no particular limitation so long as the material has an electroconductive metallic surface compatible with cationic electropaint coating. More specifically, for example, materials made of iron, copper, aluminum, alloys containing these metals; and articles on which these metals are plated or vacuum deposited may be used. Shell bodies of automobiles, trucks, bases, motorcycles for which plates of those metals or alloys are used are suitable. Surfaces of such metallic objects are preferably chemically pretreated with phosphate, chromate or the like, prior to the cationic electropaint application.

As cationic electropaint (A), those known per se can be used. More specifically, water based paints in which basic resins which can be rendered water-soluble or water-dispersible when neutralized with organic or inorganic acid, such as epoxy, acrylic or polybutadiene-type resins having many amino groups in their skeletal structure are used as the base resin are useful. Such base resin(s) are blended with neutralizers, pigments (e.g., coloring pigments, extenders, rust protective pigments and the like), hydrophilic solvent, water, and if necessary curing agents, crosslinking agents and other additives and formed into paint compositions by a method known per se. As neutralizers to render such basic resins (which are usually used as dissolved in hydrophilic solvent) water-soluble or water-dispersible, organic acids such as acetic acid, hydroxyacetic acid, propionic acid, butyric acid, lactic acid and glycine; and inorganic acids such as sulfuric acid, hydrochloric acid and phosphoric acid can be used. Suitable blend ratio of the neutralizer is within a range of from about 0.1 to about 0.4 in terms of the neutralization equivalent, to base value (about 30–about 200 mgKOH/g) of said resin.

Such a cationic electropaint (A) is diluted with, for example, deionizing water to a solid content of about 5–40% by weight, and applied onto earlier described metallic object to effect cationic electrodeposition by a process known per se, while being maintained at a pH within a range of 5.5–8.0. The thickness of the electropaint coating usually is within a range of 10–40 $\mu$m, preferably 15–30 $\mu$m, as cured coating film. Such electropaint coating can be cured by heating at temperatures of about 140–about 210° C. for around 10–40 minutes. According to the present process, above-described present paint composition (B) is applied either onto the electropaint-coated surface after said heating for curing or onto the unheated, uncured electropaint-coated surface.

The paint composition (B) is adjusted to have, for example, a viscosity of 10–40 seconds/ Ford Cup #4/20° C.

and a solid content of 30–60% by weight, and thereafter applied onto cured or uncured cationic electropaint-coated surface by means known per se, e.g., spray coating, brush coating, dip coating and the like. The applied coating film thickness suitably ranges, as dry film thickness, 1–20 μm, in particular, 5–15 μm.

Said polyurethane resin (a) in the present paint compositions has a function to raise viscosity of the compositions, but because the compositions also contain water-soluble organic solvent (b), they scarcely show viscosity rise and hence excel in coating operability. On the other hand, said water-soluble organic solvent (b) has relatively low boiling point and volatilizes during coating operations and does not substantially remain in the coating film after the application. Hence viscosity of the coating rapidly rises after the application and the resulting film is free from sagging or sliding down.

According to the present process, after applying a present paint composition (B) onto the electropaint (A)-coated surface, a water based intermediate coating (C) is applied onto the surface of the applied paint composition (B), preferably without intervening heating for curing.

As such water based intermediate coating (C), those known per se and excel in adhesive property, leveling property, distinctness-of-image gloss, overbake resistance and weatherability can be used. More specifically, water based intermediate paints containing, as vehicle component, base resin such as short oil or ultrashort oil alkyd resin not more than 30% in oil length, or oil-free polyester resin; and crosslinking agent such as amino resin: said vehicle component being suitably blended with extender, coloring pigment and other paint additives, can be conveniently used. As said alkyd resin and polyester resin, those preferred have hydroxyl values within a range of 60–140 mgKOH/g and acid values within a range of 10–50 mgKOH/g, and wherein unsaturated oil (or unsaturated fatty acid) is used as modifying oil. As amino resin serving as a crosslinking agent, for example, $C_1$–$C_5$ alkyletherified melamine resin, urea resin or benzoguanamine resin are suitable. Generally preferred blend ratios of those components are, based on the solid weight, 65–85% of such alkyd resin and oil-free polyester resin, in particular, 70–80%; 35–15% of the amino resin, in particular, 30–20%. It is also permissible to replace a part or whole of the amino resin with polyisocyanate compound or blocked polyisocyanate compound. It is generally preferred for coating film formed of such an intermediate paint to have a hardness (pencil hardness) within a range of 3B–2H.

Application of the water based intermediate paint (C) onto the surface which is coated with a present composition (B) can be performed in the manner similar to earlier described method. Usually preferred thickness for the coated film ranges 20–50 μm, in particular, 25–40 μm, as cured film thickness. After the application, the applied film of (C) or the two films of (B) and (C) can be cured by, for example, heating at temperatures of about 120–about 170° C., in particular, at about 120–150° C., for around 10–40 minutes. After curing these films or not curing the films but leaving (them uncured, top coating (D) is applied onto the surface coated with the water based intermediate coating (C).

As the top coating (D), paints known per se and are capable of forming coating films excelling in distinctness-of-image-gloss, leveling property, gloss, weatherability and chemical resistance can be used. More specifically, for example, liquid paints derived from acrylic resin/amino resin system, alkyd resin/amino resin system and polyester resin/amino resin system can be used, which may be in the form of organic solution, non-aqueous dispersion, aqueous solution or aqueous dispersion.

Top coating paints (D) can be classified into solid color paints formed by blending these liquid paints with solid color pigments; metallic paints formed by blending them with metallic pigments; and clear paints which contain little or no solid color or metallic pigment. According to the present process, one or more of these paints are used to form the top coating by 1-coat system, 2-coat system and the like. More specifically, there is solid color finish by 1-coat system in which a solid color paint is applied onto the intermediate coating surface to a cured film thickness of 10–40 μm, in particular, 15–30 μm, and heated at temperatures of about 100–about 160° C. for around 10–40 minutes; or solid color or metallic finish method conducted by 2-coat-1-bake system or 2-coat-2-bake system, in which a solid color paint or metallic paint is applied onto the intermediate coating-applied surface to a cured film thickness of 10–30 μm, in particular, 15–25 μm, and either cured by heating or left uncured; onto which further a clear paint is applied to a cured film thickness of 20–60 μm, in particular 30–50 μm, and heated at temperatures from about 100 to about 160° C. for around 10–40 minutes.

According to the present process, a coating film of the present paint composition (B) is formed between a cationic electropaint coating and an intermediate coating, whereby chipping resistance of ultimately formed multi-layered coating can be drastically improved. The present paint compositions, furthermore, have such advantages as (1) being free of environmental pollution problem or safety problem, because they are water based paints, (2) being capable of forming coatings of high decorative effect, as they are concurrently baked with intermediate coating, (3) good adhesive property to cationic electropaint coating, and (4) good adhesive property to intermediate coating.

Hereinafter the invention is more specifically explained, referring to Examples and Comparative Examples in which parts and percentages are by weight and thickness values of coating films are those of cured films.

1. PREPARATION OF SAMPLES 1) metallic object to be coated: a dull-finished steel sheet which was treated with PALBOND™ #3030 (Nihon Parkerizing Co., Ltd., zinc phosphate-type) 2) cationic electropaint (A): ELECRON™ #HG-10 (Kansai Paint Co., Ltd., an epoxypolyamide-derived cationic electropaint) 3) present paint composition (B): a composition formed by blending with water 70 parts of a hydroxyl-containing, water-dispersible polyester resin (note 1), 30 parts of a melamine resin, 80 parts of white titanium pigment, 3 parts of carbon black, 3 parts of TAFIGEL™ PUR-60 as polyurethane resin (a) and 10 parts of ethylene glycol monomethyl ether as water soluble organic solvent (b), and adjusting the viscosity to 25 seconds/Ford Cup #4/20° C. and a solid content, to 40%.

(note 1) polyester resin: an aqueous dispersion formed by steps of reacting 0.27 mole of neopentyl glycol, 0.33 mole of trimethylolpropane, 0.4 mole of butyl ethyl propanediol, 0.25 mole of isophthalic acid, 0.3 mole of adipic acid and 0.3 mole of hexahydrophtalic anhydride; adding 0.05 mole of trimellitic anhydride to the formed reaction product; removing the solvent, neutralizing with dimethylethanolamine; and mixing with water. Thus formed polyester resin had a hydroxyl value of 130 mgKOH/g, an acid value of 25 mgKOH/g and a number-average molecular weight of 1,800.

4) aqueous intermediate coating (C): ASCA-BAKE™ WP (Kansai Paint Co., Ltd., an alkyd resin/amino resin system, water based intermediate paint) 5) top coating (D): MAGICRON SILVER™ (Kansai Paint Co., Ltd., an acrylic resin/amino resin system, organic solvent based silver metallic top coating) and MAGICRON CLEAR™ (Kansai Paint Co., Ltd., an acrylic resin/amino resin system, organic solvent based clear top coating).

2. EXAMPLES AND COMPARATIVE EXAMPLES

Example 1

The cationic electropaint (A) was applied onto the metallic object by a conventional method to a film thickness of 20 μm, washed with water and cured by heating at 170° C. for 30 minutes. Then, onto the electrodeposited and cured surface the present paint composition (B) was spray-coated to a film thickness of 10 μm, air-dried for 3 minutes at room temperature, and then the water based intermediate coating (C) was applied thereon to a film thickness of 30 μm, followed by curing by heating at 140° C. for 30 minutes. Thereafter MAGICRON SILVER™ was applied to a film thickness of 15 μm and MAGICRON CLEAR™, to a film thickness of 35 μm, by wet-on-wet, followed by 30 minutes' heating at 140° C. to cure the two coatings to form a multi-layered coating. The resultant multi-layered coating exhibited excellent leveling property, chipping resistance (note 2) evaluated to be ○ and impact resistance (note 3) of at least 50 cm.

COMPARATIVE EXAMPLE 1

Example 1 was repeated except that the present paint composition (B) was not used, and a multi-layered coating was formed. The coating exhibited insufficient leveling property, chipping resistance (note 2) of x, and impact resistance (note 3) of 30 cm.

(note 2) chipping resistance: 500 ml of gravel of 15–20 ml in diameter was shot against coated surfaces of the samples at an angle of 45° at about 20° C. under pressure of 2 kg/cm$^2$, with Q-C-R Gravelo-Meter™ (Q-Panel Co., Ltd.), and condition of the hit surfaces were visually evaluated according to the following standard.

- ○ (good): a few occurrences of impact flaws in the top coating were observed but no peeling in electrodeposited coating occurred;
- Δ (rather poor): many impact flaws were observed in the top coating and a few peeled places in the electrodeposited coating were observed;
- x (poor): many impact flaws were observed in the top coating and also many peeled places in the electrodeposited coating were observed.

(note 3) impact resistance: using DuPont Impact Tester, a 500 g weight with ½ inch hitting core was dropped on the coated surface of each sample at 20° C., and the maximum height (cm) of the dropped weight which did not cause any crack in the coated surface was measured.

What is claimed is:

1. A process for forming multi-layered coating which comprises applying onto a metallic object a cationic electropaint, a water based paint composition water based intermediate coating and top coating, by the order stated, said water based paint composition comprising:
   (a) a polyurethane resin obtained by urethanation reaction of polyisocyanate compound with polyalkylene glycol and further reaction of so formed isocyanate-containing prepolymer with monohydric alcohol having at least 5 carbon atoms, and
   (b) water-soluable organic solvent having boiling point not higher than 150° C.

2. The process according to claim 1, in which said polyisocyanate compound is selected from the group consisting of aliphatic diisocyanates and alicyclic diisocyanates.

3. The process according to claim 1, in which said polyisocyanate compound is selected from the group consisting of hexamethylene diisocyanate, 2,2,4-trimethylhexane diisocyanate, lysine diisocyanate, 1,4-cyclohexane diisocyanate, 1-isocyanato-3-isocyanatomethyl-3,5,5-trimethylcyclohexane (isophorone diisocyanate), 4,4'-di-cyclohexylmethane diisocyanate, methylcyclohexylene diisocyanate, isopropylidenedicyclohexyl-4,4'-diisocyanate and modified products of these diisocyanates.

4. The process according to claim 1, in which said polyalkylene glycol has number-average molecular weight within a range of 500–5,000.

5. The process according to claim 1, in which said polyalkylene glycol is selected from the group consisting of polyethylene glycol, polypropylene glycol, polyethylene-propylene (block or random)glycol, polytetramethylene ether glycol, polyhexamethylene ether glycol and polyoctamethylene ether glycol.

6. The process according to claim 1, in which said isocyanate-containing propolymer is formed by urethanation reaction of, in addition to polyisocyanate compound and polyalkylene glycol, a low molecular weight glycol having number-average molecular weight less than 500.

7. The process according to claim 6, in which said low molecular weight glycol is used in an amount within a range of 0.1–20% by weight based on the weight of the polyalkylene glycol.

8. The process according to claim 1, in which said monohydric alcohol is selected from $C_6$–$C_{10}$ monohydric alcohols.

9. The process according to claim 1, in which said monohydric alcohol is selected from the group consisting of amyl alcohol, hexyl alcohol, ethylbutyl alcohol, heptanol, actyl alcohol, 2-ethylhexyl alcohol, nonyl alcohol and decanol.

10. The process according to claim 1, in which said polyurethane resin (a) has number-average molecular weight within a range of 700–10,000.

11. The process according to claim 1, in which said water-soluble organic solvent (b) has such a solubility that at least 50 parts by weight thereof is soluble in 100 parts by weight of water.

12. The process according to claim 1, which contains said water-soluble organic solvent (b) has a boiling point within a range of 80–130° C.

13. The process according to claim 1, which contains said polyurethane resin (a) in an amount ranging 0.01–10 parts by weight (as solid) per 100 parts by weight of total resin solid present in the water based paint composition excepting the polyurethane resin (a).

14. The process according to claim 1, which contains said water-soluble organic solvent (b) in an amount ranging 3–40 parts by weight (as solid) per 100 parts by weight of total resin solid present in the water based paint composition excepting the polyurethane resin (a).

15. Articles coated by the process of claim 1.

* * * * *